United States Patent [19]
Codatto

[11] Patent Number: 5,761,951
[45] Date of Patent: Jun. 9, 1998

[54] MECHANICAL HAND FOR MOVING PLATES, IN PARTICULAR SHEET METAL PANELS, WITH RESPECT TO A MACHINE TOOL SUCH AS A BENDING PRESS

[75] Inventor: Antonio Codatto, Lonigo, Italy

[73] Assignee: Amada Company, Ltd., Kanagawa-ken, Japan

[21] Appl. No.: 591,440

[22] PCT Filed: Jul. 25, 1994

[86] PCT No.: PCT/EP94/02452

§ 371 Date: Jan. 23, 1996

§ 102(e) Date: Jan. 23, 1996

[87] PCT Pub. No.: WO95/03901

PCT Pub. Date: Feb. 9, 1995

[30] Foreign Application Priority Data

Jul. 29, 1993 [IT] Italy ................... TO93A0569

[51] Int. Cl.⁶ .................................................... B21J 13/10
[52] U.S. Cl. ........................................ 72/420; 72/422
[58] Field of Search .............................. 72/420, 422, 323

[56] References Cited

U.S. PATENT DOCUMENTS

| | | |
|---|---|---|
| 3,181,858 | 5/1965 | Daniels. |
| 4,399,675 | 8/1983 | Erdmann et al. ............ 72/420 |
| 4,787,282 | 11/1988 | Okachi. |
| 5,187,958 | 2/1993 | Prunotto et al. ............ 72/422 |

FOREIGN PATENT DOCUMENTS

| | | |
|---|---|---|
| 0094927 | 3/1983 | European Pat. Off. . |
| 0338132 | 10/1989 | European Pat. Off. . |
| 0482702 | 4/1992 | European Pat. Off. . |
| 0561443 | 9/1993 | European Pat. Off. . |
| 2125613 | 5/1972 | France . |
| 8816259 | 4/1989 | Germany . |

*Primary Examiner*—Lowell A. Larson
*Assistant Examiner*—Ed Tolan
*Attorney, Agent, or Firm*—Sughrue, Mion, Zinn, Macpeak & Seas, PLLC

[57] ABSTRACT

The mechanical hand (16) comprises, on one hand, a zone (46) for the support and sliding of a panel or slab (SP) in a horizontal working plane (WP) and, on the other hand, a handling gripper (36) which can move horizontally along and across the whole range of said supporting and sliding zone (46). The gripper (36) has a lower jaw (40) located below the working plane (WP). The support and sliding zone (46) is defined by retractable members consisting of an array of vertically moving pillars (48) with each of which are associated positive control means for causing them to perform selectively a travel independently of that of the other pillars between a raised position in which one of its upper support and sliding surfaces is in the working plane (WP), and a lowered position in which the surface is at a level which is lower than that of the lower jaw (40) of the gripper (36). Control means are provided which interconnect the means (Mx, My, Mz) for controlling the movement of the gripper (36) and the means for controlling the movements of each support (48) such that, when the gripper (36) passes through and stops in the zone (46) of the pillars (48), the pillars (48a) which are in correspondence with or in the vicinity of the gripper (36) are lowered such that they do not interfere with its lower jaw (40) whilst the other pillars (48) are raised in order to hold the panel (SP).

7 Claims, 4 Drawing Sheets

MECHANICAL HAND FOR MOVING PLATES, IN PARTICULAR SHEET METAL PANELS, WITH RESPECT TO A MACHINE TOOL SUCH AS A BENDING PRESS

The present invention relates to a mechanical hand for moving plates according to the preamble of claim 1.

The document EP-A-0 482 702 (=U.S. Pat. No. 5,180,049) discloses a mechanical hand for the movement of metal sheets with respect to a punching machine and/or shearing machine in which the support and sliding zone of the slab in the working plane comprises, as retractable members, a plurality of parallel rows of upwardly directed bristles and the upper ends of which lie in the working plane. A handling gripper comprises a lower jaw situated below the working plane or in a position in which it interferes with the bristles. When the manipulating gripper travels through the bristle zone, the bristles bend elastically under the thrust of the lower jaw whilst the surrounding bristles remain erect and support the metal sheet.

The solution according to the document EP-A-0 482 702 offers the advantage, with respect to the mechanical hands according to the art preceding this document, of enabling the gripper to reach positions which are very close to the tools of a machine tool. However, this is affected by a restriction of the height dimensions of the lower jaw of the gripper: it is not, in fact, possible for the bristles to be higher than 2–3 cm since, if they were higher, they would be too flexible and would bend under the weight of the metal sheet such that the latter would no longer be supported exactly in the working plane.

A restriction of the height of the lower jaw of the gripper implies a restriction of its strength which is manifested by the impossibility of handling relatively heavy metal sheets.

The document U.S. Pat. No. 4,787,282 discloses a mechanical hand for the movement of the metal sheets with respect to a punching machine in which the support and sliding zone of a sheet in the working plane comprises, as retractable members, idle balls arranged in a fixed table. To prevent the lower parts of work holders or grippers from impinging on the idle balls, the latter are lowered one row after the other, below the surface of the fixed table, by a cam projecting from a transfer table on which the grippers are mounted.

This solution is not applicable to an iron hand for a bending press arranged to produce downwardly directed folds in a sheet metal panel, because it does not provide means to lower the idle balls independently from the transfer table so as to allow the passage of the downwardly directed folds over the balls.

The object of the present invention is to provide a mechanical hand of the type in question which does not have the above said limitations, that is enable a handling gripper to be used which is provided with a lower jaw which has a relatively large height and is consequently sufficiently robust to be able to manipulate sheet metal panels, or plates of another type, of relatively great weight, whilst maintaining the advantageous possibility of moving the gripper close to the tools of the machine, for example to the blades of a bending press.

According to the present invention, this object is achieved by means of a mechanical hand of the type in question which is essentially defined in the characterizing part of claim 1.

By virtue of the claimed solution, the height of the lower jaw of the gripper can have any value and is only restricted by the extent of the upward and downward travel of the pillars which can even be approximately 10 cm.

A further advantage of the invention is provided by the possibility of associating the mechanical hand with a bending press arranged so as to produce downwardly directed folds in a sheet metal panel. In this case, the control means can be programmed such that they lower the pillars which are in correspondence with or in the vicinity of a direct downward fold such that they do not interfere with the latter whilst the other pillars are raised so as to support the panel in the working plane.

A mechanical hand having the features described in the preamble of claim 1 and retractable members in the form of an array of vertically moving pillars is described and shown in document EP-A-0 561 443 of the same Applicant, which was not published on the priority date of the present application.

The invention has been developed with respect to its application to a mechanical hand for moving sheet metal panels with respect to a bending press but its application can also be extended to the moving of other types of plates, not necessarily of sheet metal, and to other machine tools such as punching machines and shearing machines.

The invention will be better understood from the description which follows of a preferred embodiment, illustrated in the appended drawings, given by way of non-limiting example and in which.

Figure 1:
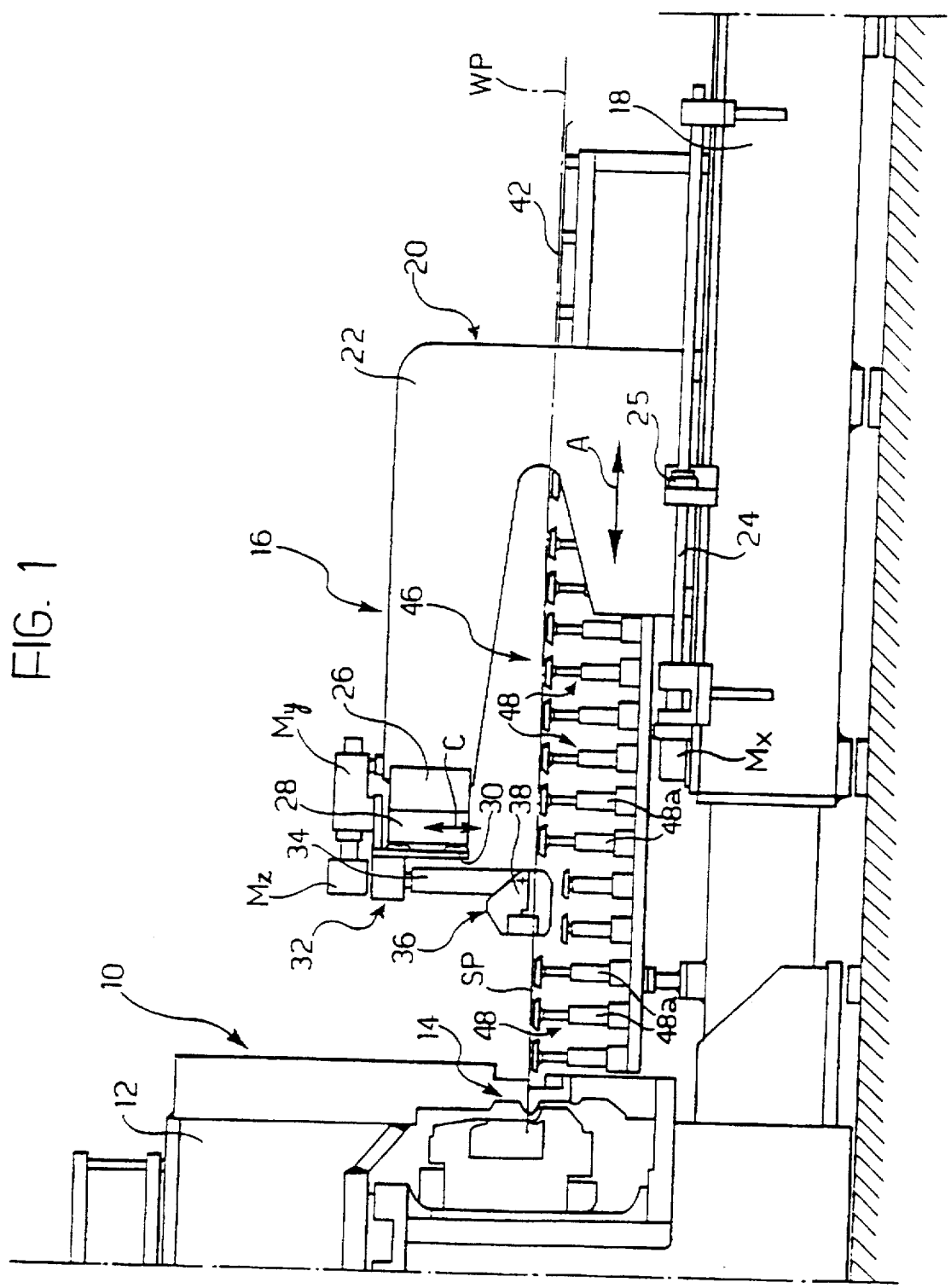
FIG. 1 is a schematic side elevation view of the unit comprising a bending press for metal sheets and a mechanical hand according to the invention.

FIG. 1 illustrates a double-action bending press, generally designated 10, which may be of the type illustrated in the document U.S. Pat. No. 4,836,004.

The bending press 10 substantially comprises a robust C-shaped frame 12 which carries a group of fixed and mobile blades and counter-blades, generally indicated 14, for the details of which reference is made to the above U.S. document.

Figure 2:
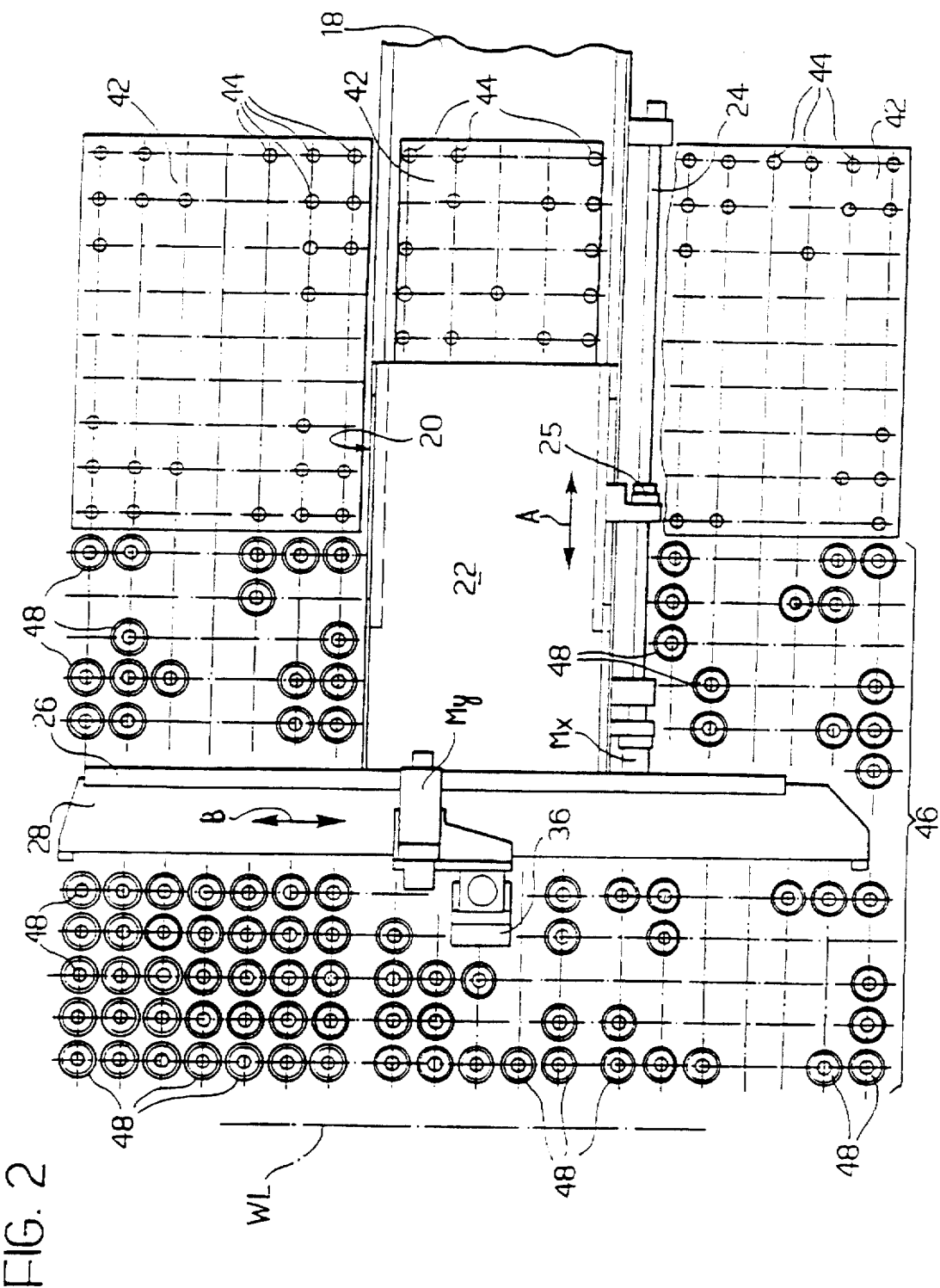
FIG. 2 is a plan view from above of the mechanical hand.

In FIG. 2, the trace of the folds made by the group of tools 14 is indicated WL.

Returning to FIG. 1 the working plane in which a sheet metal panel SP is supported, the edges of which are to be folded in the press 10, is indicated WP.

Referring to FIGS. 1 and 2, a mechanical hand, generally indicated 16, comprises a base 18 along which a slide 20 with a cantilever upper arm 22 can move towards the press 10 and in the opposite direction, according to the double arrow A.

The movements of the slide 20 according to the double arrow A are controlled from a numerically controlled stepper motor Mx which in turn controls a worm screw shaft 24 carried by the base 18 and associated with a lead screw 25 integral with the slide 20.

At its free end, the upper arm 22 of the slide 20 carries a transverse guide 26 to which a slide 28, which can move transversely according to the double arrow B of FIG. 2, that is parallel to the working line WL of the press 22, is slidingly coupled.

The transverse horizontal movements of the slide 28 are controlled from a numerically controlled stepper motor My carried at the free end of the arm 22.

The slide 28 in turn carries a slide 30 which moves vertically according to the double arrow C. The slide 30 carries an assembly 32 which comprises a vertical shaft 34 with a lower gripper 36, of known type, which in turn comprises an oscillating upper jaw 38 and a lower jaw 40 which is rigidly integral with the shaft 34.

A stepper motor Mz controls the rotations of the gripper 36 about the vertical axis of the shaft 34.

The gripper 36 is thus arranged so as to grasp a sheet metal panel SP in the horizontal working plane WP and transport it longitudinally and transversely that is forwards and backwards relative to the working line WL and parallel to this line, under the action of the two motors, Mx and My respectively, as well as causing the panel SP to rotate about the vertical axis of the shaft 34 under the action of the motor Mz.

In the part further away from the press 10, the working plane WP is defined by fixed horizontal tables 42 provided, in known manner, with arrays of supporting and sliding balls 44.

In accordance with the invention, the working plane WP comprises a particular support and sliding zone for the plate or panel SP, which extends in front of the press 10 and to the sides of the slide 20. This particular zone is generally indicated 46.

The zone 46 is defined by a plurality of retractable members 48 disposed in rows and columns, preferably, as illustrated, in the two perpendicular directions corresponding to the double arrows A and B showing the horizontal movement of the gripper 36.

The structure associated with each pillar 48 will now be described with reference to FIG. 3.

Figure 3:
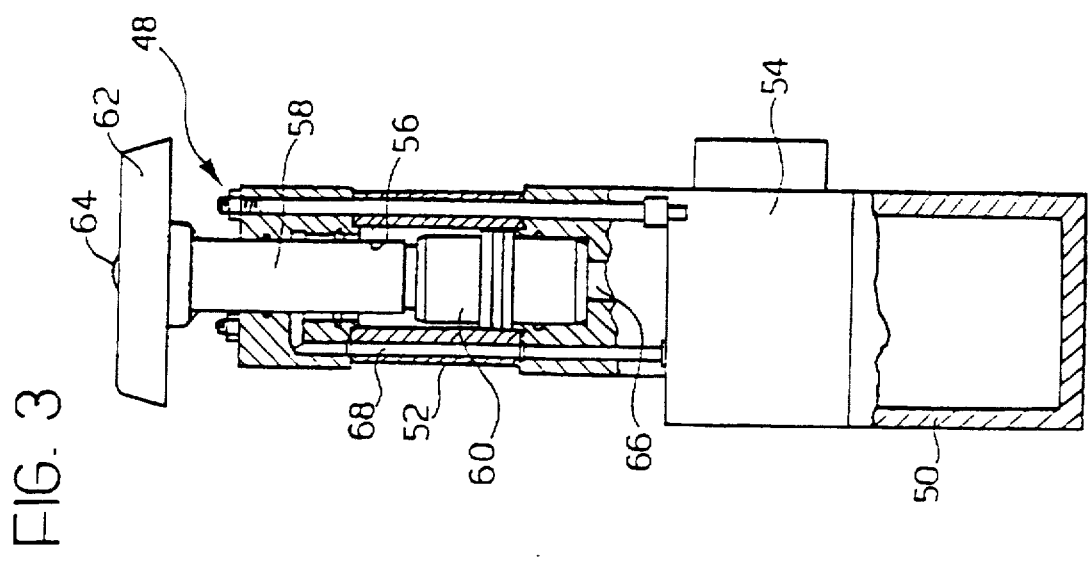
FIG. 3 is an elevation view partially in section of one of the pillars which define the working plane of the mechanical hand.

With reference to FIG. 3, each row (or each column) of pillars 48 is supported by a tubular element 50 (shown in FIG. 4) which, as will be seen better below, acts as a compressed air feed collector.

Each pillar 48 comprises a body 52 supported by the collector 50 via a switching solenoid valve 54.

The body 52 defines a vertical cylinder 56 in which a stem 58 having a piston-like lower part 60 can slide vertically.

At the top, the stem 58 has a mushroom-like head 62 which has a ball 64 which can rotate freely on the head 62 as a support and sliding surface for the panel ST.

The unit formed by the stem 58, its piston 60 and the cylinder 56 constitutes a double-action pneumatic actuator for controlling the ascent and descent of the head 62.

The solenoid valve is of the type having two positions for controlling alternately the passage of the compressed air from inside the collector 50 to the lower side of the piston 60 by means of a duct 66 and to the upper side of the piston itself via a duct 68 provided in the body 52.

The arrangement is such that, when the compressed air is admitted below the piston 60, the pillar 48 is raised, and its upper support and sliding surface formed by the ball 64 is in the working plane WP of FIG. 1; in contrast, when the atmospheric pressure acts on the piston 60, the pillar 48 is lowered and its upper support and sliding surface is at a level lower than that of the lower jaw 40 of the gripper 36.

In FIG. 1 it can be seen that all the pillars indicated 48 are in the raised position whilst two pillars, indicated 48A, are in the lowered position below the gripper 36.

With reference to FIG. 4, the block NC indicates a numerical control apparatus which controls the movements of the three motors of FIG. 1, illustrated schematically in FIG. 4 and again indicated Mx, My and Mz.

In known manner, the apparatus MC knows at any moment both the linear and angular positions of the handling gripper 36 on the basis of the commands supplied to the three motors Mx, My, Mz.

On the basis of these positions of the gripper 36, the apparatus NC controls the solenoid valves 54 such that, when the gripper 36 passes through and stops in the pillar zone, the pillars 48a which are in correspondence with or in the vicinity of the gripper 36 are lowered so as not to interfere with its lower jaw 40 whilst the other pillars 48 are kept raised in order to support the plate or panel SP.

Figure 5:
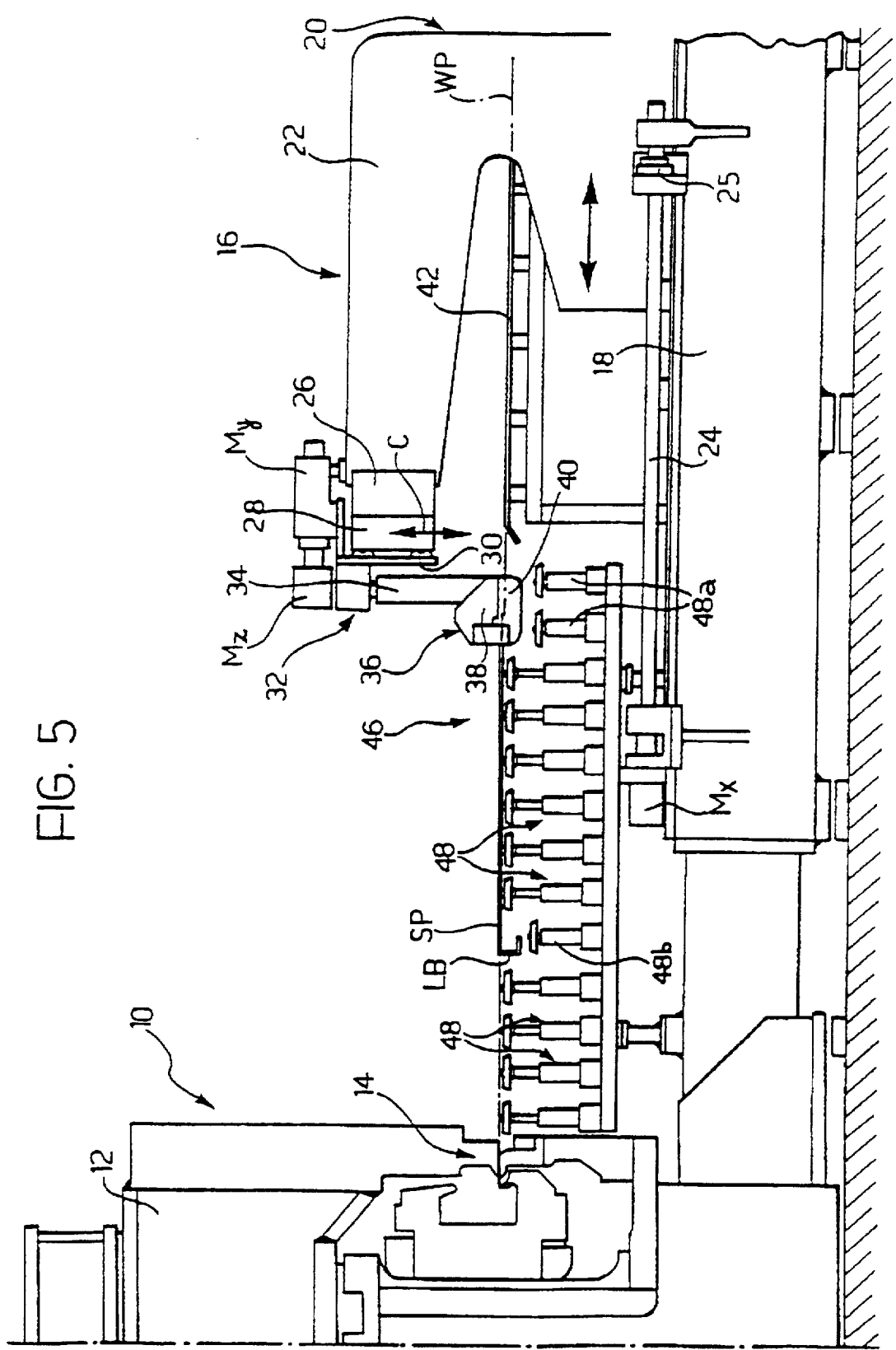
FIG. 5 is a schematic side elevation view similar to FIG. 1, representing a different working position of the mechanical hand.

FIG. 5, which is similar to FIG. 1, illustrates a further possibility provided by the invention.

In FIG. 5, the parts which are identical to those of FIG. 1 are indicated by the same reference signs.

In FIG. 5, a sheet metal panel being worked in the press 10 is again indicated SP. The press 10 has performed a direct downward fold LB on the panel SP which, in the absence of other devices, would interfere with the pillars 48 in the raised position.

The pillars lowered below the gripper 36 are again indicated 48a in FIG. 5.

A lowered pillar below the fold LB, however, is indicated 48b.

Figure 4:
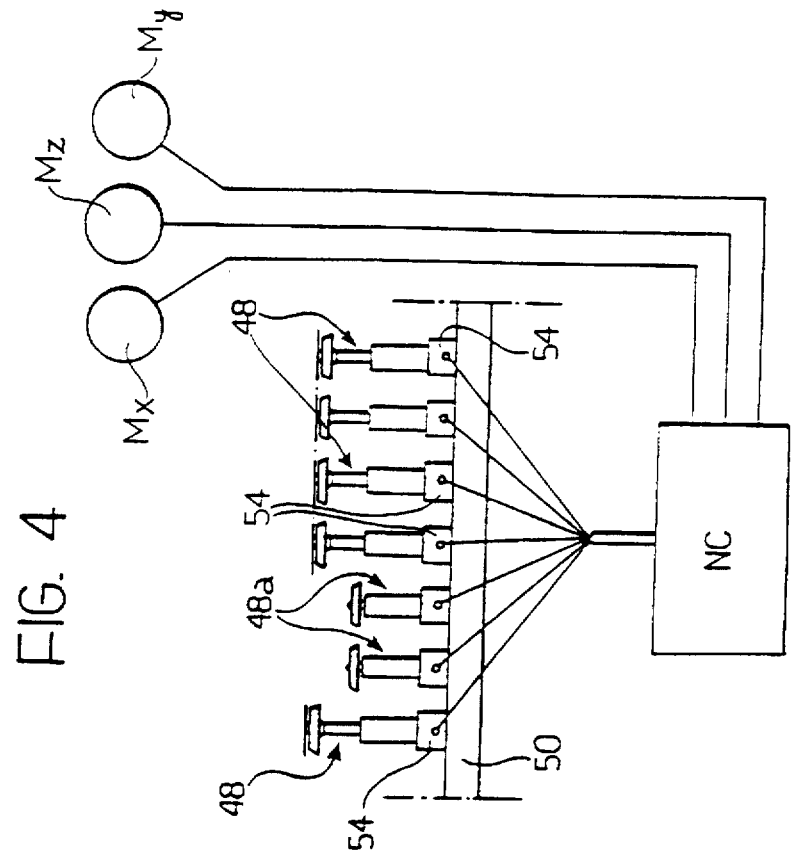
FIG. 4 is a schematic representation illustrating the control system of the mechanical hand.

In order to obtain this result, the control apparatus NC of FIG. 4 is disposed such that, when a direct downward fold such as LB passes through the stops in the zone of the pillars 48, the pillars 48b which are in correspondence with or in the vicinity of the fold itself are lowered so as not to interfere with this fold.

Naturally, the invention is applicable to a handling system having two or more grippers, for example, for moving plates or panels between two or more presses arranged for folding different edges of a panel.

I claim:

1. A mechanical hand for moving plates, particularly sheet metal panels (SP), with respect to a machine tool such as a bending press (10), which is adapted to work on the plate in a horizontal working plane (WP), in which the mechanical hand (16) comprises a zone (46) for the support and sliding of the plate (SP) in the working plane (WP), which zone is defined by a plurality of retractable members (48), and at least one handling gripper (36) which is adapted to grasp the plate (SP) in the working plane (WP) and is movable horizontally along and across the whole range of the zone (46) of the working plane (WP) defined by the retractable members (48), said gripper having a lower jaw (40) which is located below the working plane (WP) and which can pass through the above zone (46) by the retraction of the retractable members (48) as it passes, and means (Mx, My) for controlling the movements of the gripper (36), characterised in that the retractable members consist of an array of vertically moving pillars (48) each having an upper surface (64) for the support and sliding of the plate (SP) and to each of which are secured positive control means (54) in order to cause them to perform selectively a travel which is independent of that of the other pillars (48) between a raised position in which said upper support and sliding surface (64) is in the working plane (WP) and a lowered position in which said upper surface is at a level which is lower than that of the lower jaw (40) of the gripper (36), and in that control means (NC) are provided which interconnect the means (Mx, My) for controlling the movements of the gripper (36) and the means (54) for controlling the movements of each pillar (48) such that, when the gripper (36) passes through and stops in the zone of the pillars (48), the pillars (48a) which are in correspondence with or in the vicinity of the gripper (36) are lowered such that they do not interfere with said lower jaw (40) whilst the other pillars (48) are raised in order to support the plate (SP).

2. A mechanical hand according to claim 1, characterised in that the gripper (36) is rotatable about a vertical axis and means (Mz) are provided for controlling its rotation, these means (Mz) also being interconnected with the means (54) for controlling the movements of each pillar (48) via said control means (NC).

3. A mechanical hand according to claim 1 for a bending press (10) which can make downwardly directed folds (LB) in sheet metal panels (SP) characterised in that the control means (NC) are such that, when a downwardly directed fold (LB) passes through and stops in the zone of the pillars (48), the pillars (48b) which are in correspondence with or in the vicinity of the fold (LB) are lowered so as not to interfere with the latter.

4. A mechanical hand according to claim 1, characterised in that the means controlling the pillars (48) include respective double-action pneumatic actuators (56, 60), each of which is associated with a respective switching solenoid valve (54) which is dependent on the control means (NC).

5. A mechanical hand according to claim 1, characterised in that each pillar (48) is provided with a mushroom-like head (62) which forms the respective support and sliding surface (64).

6. A mechanical hand according to claim 5, characterised in that the support and sliding surface is defined by a ball (64) which is freely rotatable on the mushroom-like head (62).

7. A mechanical hand according to claim 1, characterised in that the control means (NC) are of the numerical type, the means for controlling the gripper consist of numerically controlled electric motors (Mx, My, Mz) and the numerical control means (NC) have signal outputs connected to the individual means (54) for controlling the pillars (48).

* * * * *